(12) United States Patent
Ashiura (10) Patent No.: US 6,550,682 B2
(45) Date of Patent: Apr. 22, 2003

(54) BAR CODE READING METHOD, BAR CODE READING APPARATUS, AND PROGRAM THEREOF

(75) Inventor: Osamu Ashiura, Tokyo (JP)

(73) Assignee: NEC Infrontia Corporation, Kanagawa (JP)

(*) Notice: Subject to any disclaimer, the term of this patent is extended or adjusted under 35 U.S.C. 154(b) by 0 days.

(21) Appl. No.: 10/083,102

(22) Filed: Feb. 27, 2002

(65) Prior Publication Data
US 2002/0158128 A1 Oct. 31, 2002

(30) Foreign Application Priority Data
Mar. 2, 2001 (JP) ........................................ 2001-058047

(51) Int. Cl.$^7$ .............................................. G06K 19/06
(52) U.S. Cl. ............................... 235/462.25; 235/462.12
(58) Field of Search ..................... 235/462.25, 462.12, 235/462.07, 462.18, 472, 494

(56) References Cited

U.S. PATENT DOCUMENTS 5,440,110 A * 8/1995 Brooks ................... 235/462.07
5,686,715 A * 11/1997 Watanabe et al. ........... 235/436

FOREIGN PATENT DOCUMENTS

| JP | 64-47945 A | 2/1989 |
|---|---|---|
| JP | 1-171972 A | 7/1989 |
| JP | 4-350644 A | 12/1992 |
| JP | 6-195497 A | 7/1994 |
| JP | 7-99528 B2 | 10/1995 |
| JP | 8-87563 A | 4/1996 |
| JP | 8-329174 A | 12/1996 |
| JP | 8-329175 A | 12/1996 |
| JP | 2655758 B2 | 5/1997 |
| JP | 2757654 B2 | 3/1998 |
| JP | 2000-99617 A | 4/2000 |

* cited by examiner

Primary Examiner—Thien M. Le
Assistant Examiner—Edwyn Labaze
(74) Attorney, Agent, or Firm—Sughrue Mion, PLLC (57) ABSTRACT

A designated code has been set at a predetermined digit position of a main portion of a bar code that contains a supplemental portion. A main portion analyzer analyzes the main portion. A presence/absence determiner determines whether or not the designated code has been set at the predetermined digit position of the main portion. If the designated code has been set, the supplemental portion analyzer performs an analyzing process until the analyzed result of the supplemental portion is obtained or until a predetermined time period elapses. If the analyzed result of the supplemental portion has been obtained, a combiner combines the analyzed results of the main portion and the supplemental portion and outputs the combined result. If the analyzed result of the supplemental portion has not been obtained, the combiner outputs only the analyzed result of the main portion.

9 Claims, 4 Drawing Sheets

PRIOR ART

FIG.1

PRIOR ART

FIG.2

PRIOR ART

| BAR CODE | GENERAL CATEGORY | RATIO OF USE | PROCESS TIME OF EXAMPLE OF EMBODIMENT | PROCESS TIME OF RELATED ART |
|---|---|---|---|---|
| FIRST BAR CODE [491 X ... X + SUPPLEMENTAL PORTION] | BAR CODE CONTAINING SUPPLEMENTAL PORTION | 9% | 160ms | 160ms |
| SECOND BAR CODE [491 X ... X (NOT CONTAINING SUPPLEMENTAL PORTION] | BAR CODE OUGHT TO CONTAIN SUPPLEMENTAL PORTION, BUT NOT CONTAINING IT. | 1% | 350ms | 350ms |
| THIRD BAR CODE [492 X ... X (NOT CONTAINING SUPPLEMENTAL PORTION)] | BAR CODE NOT CONTAINING SUPPLEMENTAL PORTION (REGULAR BAR CODE) | 90% | 150ms | 350ms |
| FOURTH BAR CODE [492 X ... X + SUPPLEMENTAL PORTION] | BAR CODE OUGHT NOT TO CONTAIN SUPPLEMENTAL PORTION, BUT CONTAINING SUPPLEMENTAL PORTION | 0% | 150ms SUPPLEMENTAL PORTION IS OMITTED. | 160ms |
| AVERAGE PROCESS TIME (EXPECTED VALUE) | | | 152.9ms | 332.9ms |

BAR CODE READING METHOD, BAR CODE READING APPARATUS, AND PROGRAM THEREOF

BACKGROUND OF THE INVENTION

1. Field of the Invention

The present invention relates to a bar code reading technology, and in particular, to that suitable in an environment that a bar code that contains a supplemental portion and a bar code that does not contain a supplemental portion coexist.

2. Description of the Related Art

Figure 1:
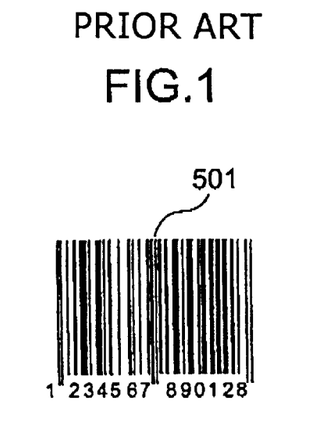
FIG. 1 is a schematic diagram showing an example of a bar code that does not contain a supplemental portion.
Figure 2:
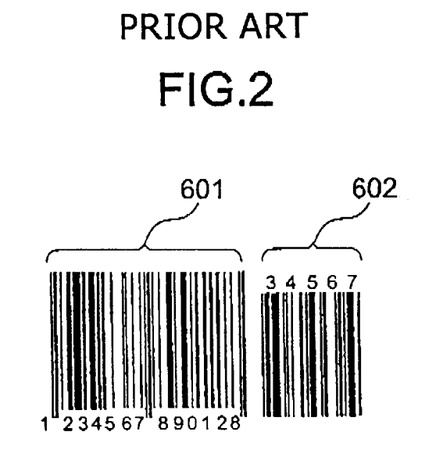
FIG. 2 is a schematic diagram showing an example of a bar code that contains a supplemental portion.

Bar codes that are combinations of white vertical lines and black vertical lines have been widely used to represent commodity information and so forth. A conventional bar code is composed of only a main portion 501 as shown in FIG. 1. However, for some commodity information, a bar code that contains a supplemental portion 602 along with a main portion 601 as shown in FIG. 2 is used. Thus, under an environment that such two types of bar codes coexist, a bar code reading apparatus that can read both bar codes that contain a supplemental portion and bar codes that do not contain a supplemental portion is required.

Figure 3:
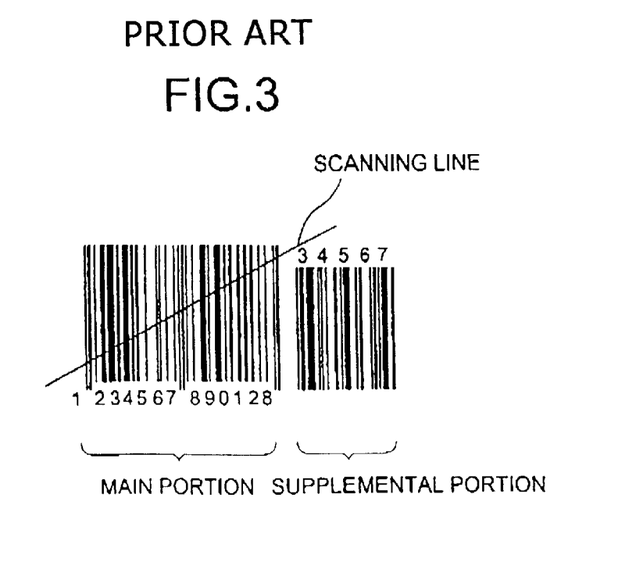
FIG. 3 is a schematic diagram for explaining disadvantages of related art technologies.

To allow both bar codes that contain a supplemental portion and bar codes that do not contain a supplemental portion to be read, a process for recognizing whether or not a bar code contains a supplemental portion is required. In other words, since a main portion of a bar code which also contains a supplemental portion can be treated as an independent bar code, if the above process of recognizing is not performed, the bar code reading process is completed after only the main portion is scanned and decoded. Thus, the supplemental portion may not be read and decoded. For example, if an operator handles a bar code render so that the bar code reader scans only a main portion of a bar code which also has a supplemental portion as shown in FIG. 3, the bar code reading process is completed after only the main portion is scanned and decoded.

As a related art reference, Japanese Patent Laid-Open Publication No. 8-329175 discloses a bar code reading apparatus.

The related art reference describes the following two types of bar code reading apparatuses. In the first bar code reading apparatus, when a main portion of a bar code is decoded unless a supplemental portion is not decoded, a timer is started. If the supplemental portion is decoded in a predetermined time period after the timer has been started, the decoded results of both the main portion and the supplemental portion are output. In contrast, when the supplemental portion is not decoded in the predetermined time period after the timer has been started, the decoded result of only the main portion is output. In other words, in the first bar code reading apparatus, an extension time period necessary for detecting whether or not the supplemental portion exists is generated by the timer process. In the extension time period, it is recognized whether or not the supplemental portion exists so as to prevent the supplemental portion from being dropped.

On the other hand, in the second bar code reading apparatus described in the forgoing related art reference, it is recognized whether or not a bar code contains a supplemental portion depending on whether or not the first three digits of the main portion are one of "977" and "978". If the first three digits are one of "977" and "978", that is, if the recognized result represents that the bar code contains a supplemental portion, then the decoded result is prohibited from being transferred to a host unit until the supplemental portion has been decoded. On the other hand, if the recognized result represents that the bar code does not contain a supplemental portion, the decoded result of only the main portion is transferred to the host unit.

However, the forgoing first and second bar code reading apparatuses (hereinafter that are referred to as first related art technology and second related art technology, respectively) have the following disadvantages.

<Disadvantages of First Related Art Technology>

As a first disadvantage of the first related art technology, since the extension time is required to detect a supplemental portion, even a bar code that does not contain a supplemental portion is always read with the extension time.

As a second disadvantage, most stores use bar codes that do not contain a supplemental portion. These stores use bar codes that contain a supplemental portion in an exceptional case. Thus, when a bar code reading apparatus reads a bar code that does not contain a supplemental portion with such a delay time, it adversely affects the their business operations.

As a third disadvantage, if the extension time period necessary for detecting a supplemental portion is shortened, the reading speed of a bar code that does not contain a supplemental portion can be improved. However, the drop ratio of a supplemental portion of a bar code becomes high. As a result, the bar code reading apparatus cannot be practically used.

<Disadvantage of Second Related Art Technology>

In the second related art technology, it is recognized whether or not a bar code contains a supplemental portion depending on whether or not the first three digits of a main portion of the bar code is one of "977" and "978". Thus, the reading speed of the second related art technology is higher than that of the first bar code reading apparatus. However, according to the second related art technology, if the first three digits of a main portion of a bar code is one of "977" and "978", the decoded result is prohibited from being transferred to the host unit until the decoded result of the supplemental portion is obtained. Thus, if the supplemental portion cannot be decoded due to a dirt or a drop, the process is delayed for a long time

SUMMARY OF THE INVENTION

Therefore, an object of the present invention is to allow the reading speed of a bar code to be improved in an environment that a bar code that contains a supplemental portion and a bar code that does not contain a supplemental portion coexist and to prevent the reading process from being delayed for a long time if the supplemental portion is expected to be read but cannot be read due to a dirt, a drop, or the like.

According to the present invention, there is provided a bar code reading method, comprising the steps of: performing a supplemental portion presence/absence determining process for determining whether or not a bar code contains a supplemental portion depending on whether or not an analyzed result of a predetermined number of digits starting from a predetermined digit position in a main portion of the bar code matches a predetermined code; if the determined result of the supplemental portion presence/absence determining process represents that the bar code does not contain the supplemental portion, outputting the analyzed result of the main portion; if the determined result of the supplemental portion presence/absence determining process represents that the bar code contains the supplemental portion, performing an analyzing process for the supplemental portion until the analyzed result of the supplemental portion is obtained or until a predetermined time period elapses; if the analyzed result has not been obtained when the predetermined time period elapses, outputting the analyzed result of only the main portion; and if the analyzed result of the supplemental portion has been obtained before the predetermined time period elapses, combining the analyzed result of the main portion and the analyzed result of the supplemental portion and outputting the combined result.

The bar code reading method may further comprises the steps of: before the supplemental portion presence/absence determining process is performed, determining whether or not the bar code is a type of bar code which has a possibility that the bar code contains a supplemental portion; and if the bar code is not the type of bar code, outputting the analyzed result of the only main portion without performing the supplemental portion presence/absence determining process; and if the bar code is the type of bar code, performing the supplemental portion presence/absence determining process.

In the bar code reading method, the type of a bar code which has the possibility that the bar code contains a supplemental portion may be one of EAN-13, EAN-8, UPC-A, and UPC-E.

These and other objects, features and advantages of the present invention will become more apparent in light of the following detailed description of the best mode embodiment thereof, as illustrated in the accompanying drawings.

DESCRIPTION OF PREFERRED EMBODIMENT

Next, with reference to the accompanying drawings, an embodiment of the present invention will be described.

Figure 4:
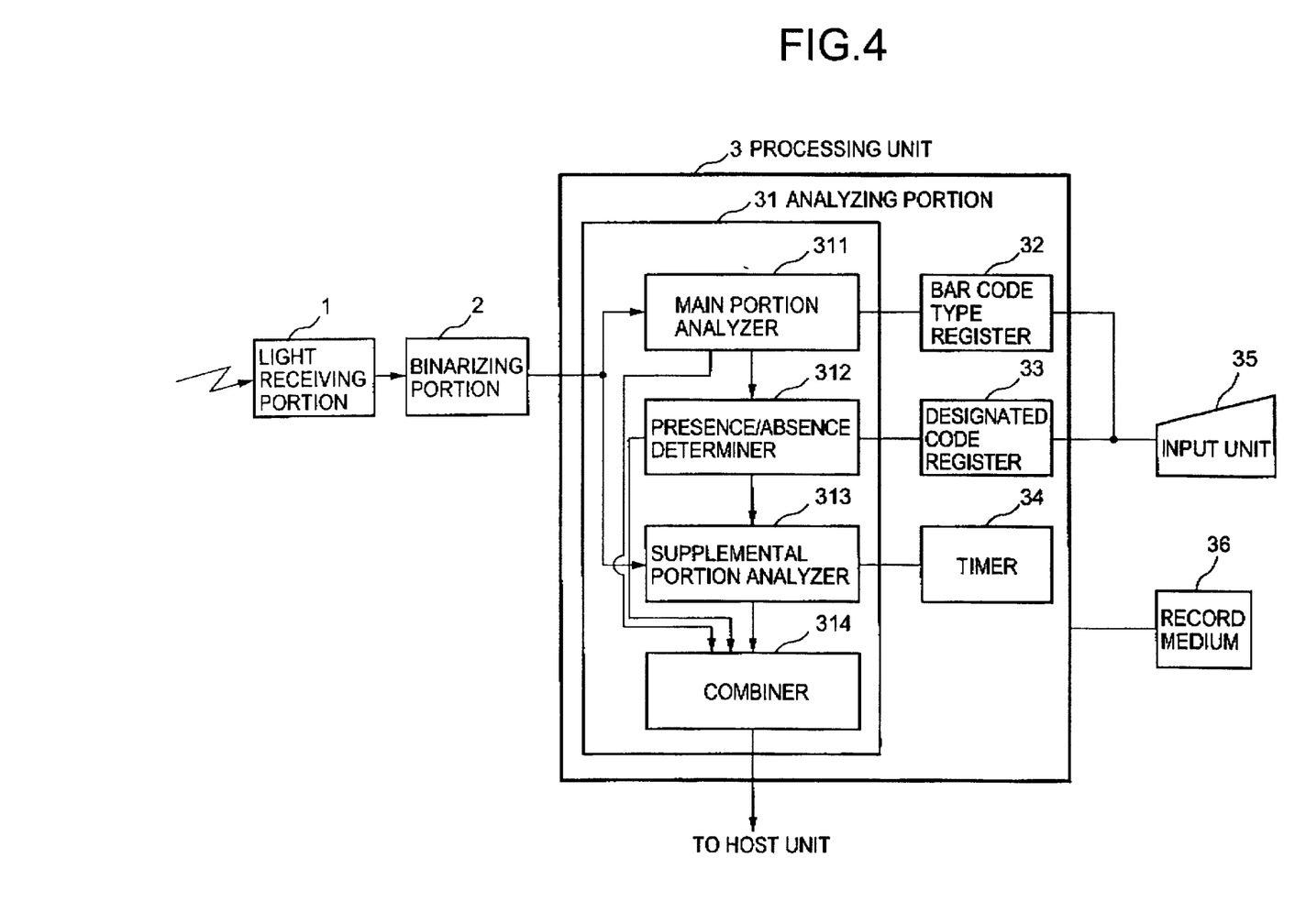
FIG. 4 is a block diagram showing an example of the structure of an embodiment of the present invention.

FIG. 4 is a block diagram showing an example of the structure of a bar code reading apparatus according to an embodiment of the present invention.

Referring to FIG. 4, the bar code reading apparatus according to the embodiment of the present invention comprises a light receiving portion 1, a binarizing portion 2, and a processing unit 3. The light receiving portion 1 is for example a CCD (Charge Coupled Device) that converts reflected light from a bar code into an analog signal. The binarizing portion 2 binarizes the analog signal that is output from the light receiving portion 1 into a digital signal. The processing unit 3 is embodied by for example a personal computer The processing unit 3 comprises an analyzing portion 31, a bar code type register 32, a designated code register 33 and a timer 34, and connected with an input unit 35 and a record medium 36. The input unit 35 is for example a keyboard.

The types of bar code that have a possibility that they contain a supplemental portion are registered with the bar code type register 32. The user registers the types of bar code with the bar code type register 32 through the input unit 35. According to the embodiment of the present invention, it is assumed that EAN-13, EAN-8, UPC-A, and UPC-E have been registered as the types of bar code.

The designated codes which start from a predetermined start digit position and continue a predetermined number of digits in a main portion of bar codes that contain a supplemental portion are registered with the designated code register 33. The user registers the designated codes through the input unit 35. According to the embodiment of the present invention, it is assumed that the designated codes are placed for the first three digits of a main portion of bar codes that contain a supplemental portion.

The timer 34 has the following function. The timer 34 measures elapsed time after the analyzing process fir the supplemental portion has been started.

The analyzing portion 31 comprises a main portion analyzer 311, a presence/absence determiner 312, a supplemental portion analyzer 313, and a combiner 314.

The main portion analyzer 311 has the following functions. The main portion analyzer 311 analyzes (decodes) a main portion of a bar code. In addition, the main portion analyzer 311 determines the type of the bar code. If the type of the bar code has not been registered with the bar code type register 32, the main portion analyzer 311 causes the combiner 314 to output the analyzed result of the main portion to a host unit (not shown) If the type of the bar code has been registered with the bar code type register 32, the main portion analyzer 311 transfers the analyzed result of the main portion to the presence/absence determiner 312.

The presence/absence determiner 312 has the following functions. The presence/absence determiner 312 determines whether or not the first three digits of the analyzed result of the main portion that has been transferred from the main portion analyzer 311 match any one of the designated codes registered with the designated code register 33. If they do not match, the presence/absence determiner 312 causes the combiner 314 to output the analyzed result of the main portion analyzer 311 to the host unit. In contrast, if they match, the analyzing portion 31 causes the supplemental portion analyzer 313 to operate.

The supplemental portion analyzer 313 has the following functions. If the presence/absence determiner 312 has caused the supplemental portion analyzer 313 to operate, the presence/absence determiner 312 starts an analyzing process for the supplemental portion corresponding to the digital signal that is supplied from the binarizing portion 2. In addition, the supplemental portion analyzer 313 resets the timer 34. If the supplemental portion analyzer 313 completes the analysis of the supplemental portion before the timer 34 has timed over, the supplemental portion analyzer 313 causes the combiner 314 to combine the analyzed results of the main portion and the supplemental portion and to output the combined result to the host unit. If the supplemental portion analyzer 313 does not completes the analysis of the supplemental portion before the timer 34 has timed over, the supplemental portion analyzer 313 causes the combiner 314 to output the analyzed result of only the main portion to the host unit.

The combiner 314 has the following function. The combiner 314 outputs the analyzed result of only the main portion or the combination or the analyzed result of the main portion and the analyzed result of the supplemental portion to the host unit corresponding to a command received from the main portion analyzer 311, the presence/absence determiner 312, and the supplemental portion analyzer 313.

The record medium 36 is for example a disk, a semiconductor memory, or another type of record medium. A program that causes the processing unit 3 that is composed of a computer to function as a part of the bar code reading apparatus has been recorded on the record medium 36. The program is read by the processing unit 3. The operation of the processing unit 3 is controlled by the program. As a result, the main portion analyzer 311, the presence/absence determiner 312, the supplemental portion analyzer 313, and the combiner 314 are embodied on the processing unit 3.

Next, the operation of the embodiment will be described,

The light receiving portion 1 converts reflected light from a bar code that is scanned by laser light into an analog signal. The binarizing portion 2 converts the analog signal that is supplied from the light receiving portion 1 into a digital signal.

Figure 5:
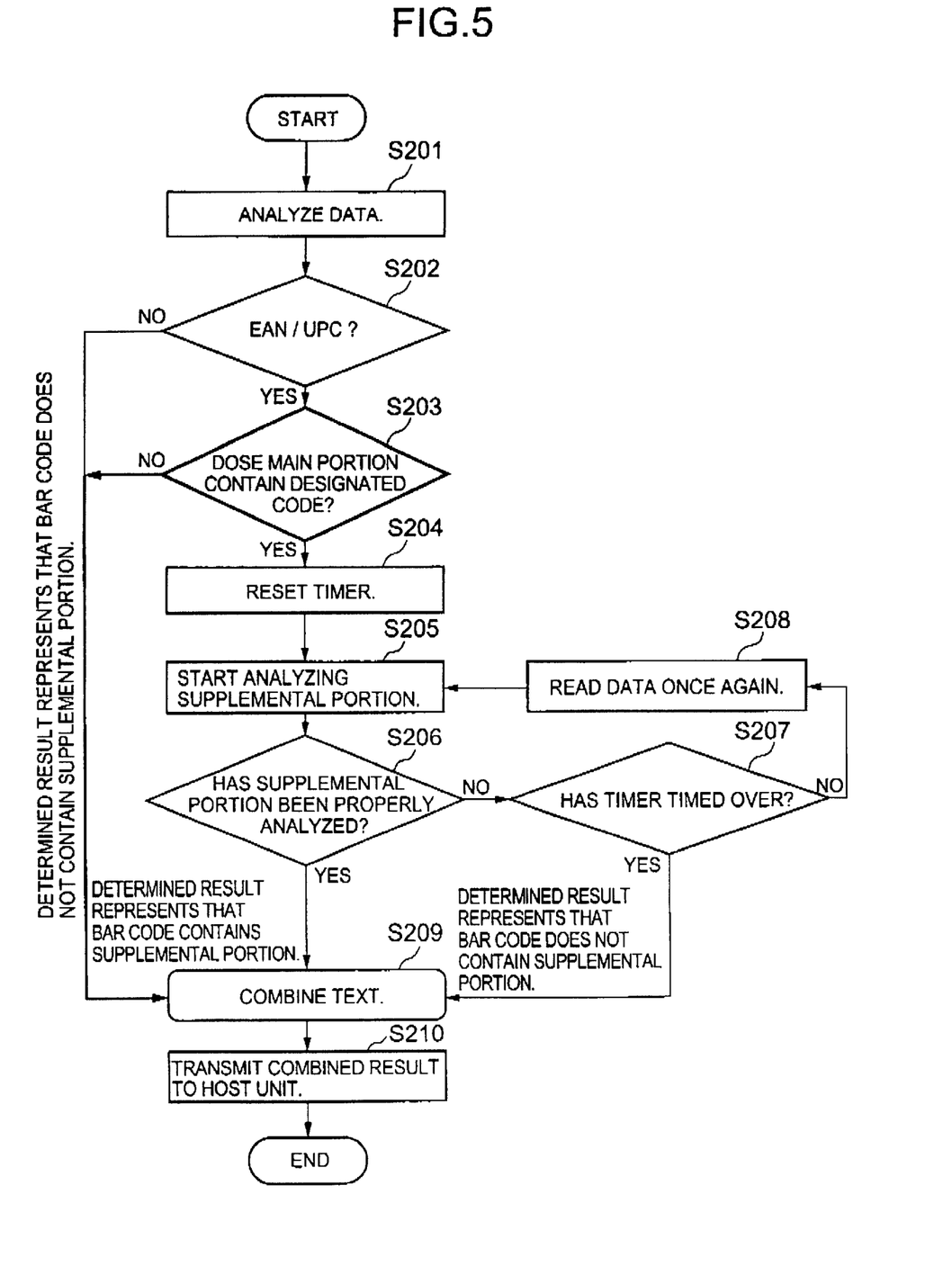
FIG. 5 is a flow chart showing an example of a process of an analyzing portion 31.

The main portion analyzer 311 of the processing unit 3 analyzes the main portion of the bar code corresponding to the digital signal that is supplied from the binarizing portion 2 (at step S201 shown in FIG. 5). At this point, the main portion analyzer 311 detects the type of the bar code corresponding to the feature thereof.

Thereafter, the main portion analyzer 311 references the bar code type register 32 and determines whether or not the bar code has a possibility that the bar code contains a supplemental portion (at step S202). In other words, the main portion analyzer 311 determines whether or not the type of the bar code is one of EAN-13, EAN-8, UPC-A and UPC-E32.

If the determined result represents that the type of the bar code is none of EAN-13, EAN-8, UPC-A and UPC-E, that is, the bar code does not contain a supplemental portion (namely, the determined result at step S202 is No), the main portion analyzer 311 causes the combiner 314 to output the analyzed result of the main portion (at step S209). As a result, the combiner 314 transmits the analyzed result obtained by the main portion analyzer 311 (namely, the analyzed result of the main portion) to the host unit (at step S210)

In contrast, if the determine result represents that the type of the bar code is any one of EAN-13, EAN-8, UPC-A and UPC-E, that is, the bar code has a possibility that the bar code contains a supplemental portion (namely, the determined result at step S202 is Yes), the main portion analyzer 311 transfers the analyzed result of the main portion to the presence/absence determiner 312.

Thus, the presence/absence determiner 312 determines whether or not the bar code contains a supplemental portion depending on whether or not the first three digits of the analyzed result of the main portion matches any one of the designated codes registered with the designated code register 33.

If the determined result represents that the bar code does not contain a supplemental portion (namely, the determined result at step S203 is No), the presence/absence determiner 312 causes the combiner 314 to output the analyzed result of the main portion (at step S209). Thus, the combiner 314 transmits the analyzed result of the main portion to the host unit (at step S210). In contrast, if the determined result represents that the bar code contains a supplemental portion (namely, the determined result at step S203 is Yes), the presence/absence determiner 312 causes the supplemental portion analyzer 313 to operate.

As a result, the supplemental portion analyzer 313 resets the timer 34. In addition, the supplemental portion analyzer 313 reads the digital signal that is supplied from the binarizing portion 2 and starts the analyzing process for a supplemental portion (at steps S204 and S205).

If the supplemental portion analyzer 313 has been normally analyzed a supplemental portion (namely, the determined result at step S206 is Yes), the supplemental portion analyzer 313 causes the combiner 314 to combine the analyzed result of the main portion and the analyzed result of the supplemental portion and to output the combined result (at step S209). Thus, the combiner 314 combines the analyzed result from the main portion analyzer 311 and the analyzed result from the supplemental portion analyzer 313 and transmits the combined result to the host unit (at step S210).

In contrast, if the supplemental portion has not been normally analyzed (namely, the determined result at step S206 is No), the supplemental portion analyzer 313 compares the counted time of the timer 34 with a predetermined time (at step S207).

If the counted time of the timer 34 exceeds the predetermined time (namely, the determined result at step S207 is Yes), the determined result represents that the bar code does not contain a supplemental portion. In this case, the supplemental portion analyzer 313 causes the combiner 314 to output the analyzed result of the main portion (at step S209). Thus, the combiner 314 transmits the analyzed result of only the main portion to the host unit (at step S210). In contrast, if the counted time of the timer 34 does not exceed the predetermined time (namely, the determined result at step S207 is No), the supplemental portion analyzer 313 further reads the digital signal that is supplied from the binarizing portion 2 and further performs the analyzing process for the supplemental portion once again (at steps S208 and S205).

(Example of Embodiment)

Next, an example of the embodiment of the present invention will be described. According to the example, it is assumed that the first three digits of a main portion of a bar code that contains a supplemental portion are "491" and that "491" has been registered with the designated code register 33. In addition, it is assumed that the designated time used for determining whether or not the timer has timed over is 200 ms.

Figure 6:
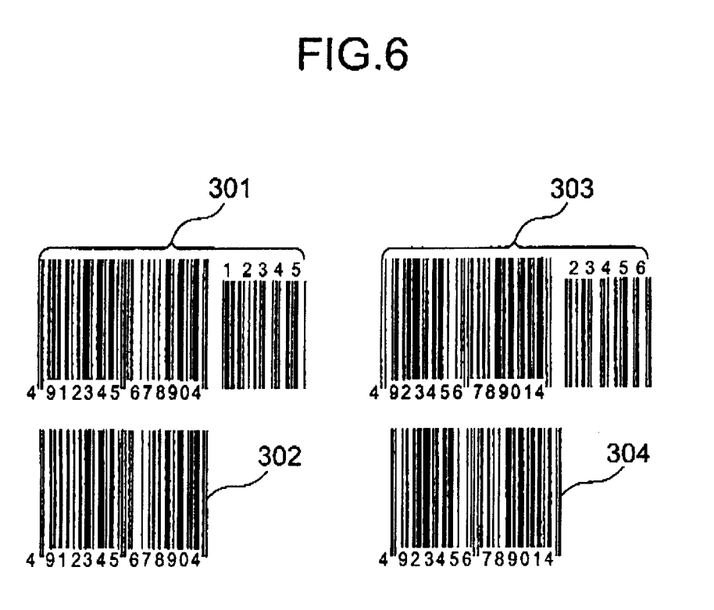
FIG. 6 is a schematic diagram showing concrete examples of a bar code.

In the example, types EAN-13, EAN-8, UPC-A and UPC-8 of bar code (namely, types of bar code for which the determined result at step S202 shown in FIG. 5 will be YES) are categorized into first to fourth classes of bar code depending on whether or not the first three digits of the main portion is "491" and on whether or not each bar code contains a supplemental portion. FIG. 6 shows concrete examples of the first to fourth classes of bar code.

Concerning a bar code 301 which is an example of the first class, the first three digits of the main portion is "491". Thus, the first class contains a supplemental portion. Concerning a bar code 302 which is an example of the second class, although the first three digits of the main portion is "491" that represents that the bar code contains a supplemental portion, the bar code 302 does not contain a supplemental portion. The second class includes a bar code that does not physically contain a supplemental portion due to a drop or the like. In addition, the second class includes a bar code whose existing supplemental portion cannot be read due to a dirty.

Concerning a bar code 303 which is an example of the third class, the first three digits of the main portion is other than "491" (in this example, the first three digits are "492"). However, the third class contains a supplemental portion. Concerning a bar code 304 which is an example of the fourth class, the first three digits of the main portion of the fourth bar code are other than "491" (in this example, the first three digits are "492"). Thus, the fourth class does not contain a supplemental portion.

The first and second classes are referred to as "EAN-13 with five-digit supplemental code". The third and fourth classes are referred to as "EAN-13 .

Next, the operation of the example will be described.

(1) First, the operation in a case where the first bar code 301 is read will be described. As described above, the first three digits of the main portion of the first bar code are "491". The first bar code contains a supplemental portion.

According to the flow chart shown in FIG. 5, the main portion of the bar code 301 is analyzed at step S201. The determined result at step S202 represents that the type of the bar code 301 is EAN-13. Thereafter, the flow advances to step S203.

At step S203, the first three digits of the analyzed result of the main portion are compared with the designated code "491" registered with the designated code register 38. In this case, since the designated code "491" matches the first three digits of the main portion, the determined result at step 8203 is "Yes". Thus, the flow advances to step S204.

At step S204, the time-over counting timer 34 is reset. At step S205, the supplemental portion is analyzed. At step S206, it is determined whether or not the supplemental portion has been properly analyzed. If the supplemental portion has not been properly analyzed, the flow advances to step S207. At step S207, it is determined whether or not the timer has timed over (in this case, 200 ms). If the timer has timed over, the determined result represents that the bar code does not contain "a supplemental portion". Thereafter, the flow advances to step S209. If the timer has not timed over, the flow advances to step S208. At step S208, data of the supplemental portion is read once again. Thereafter, the flow advances to step S205. At step S205, the data of the supplemental portion is analyzed once again.

In a case of the bar code 301, the flow early exits from a retry loop consisting of steps S205->S206->S207->S208->S205, because since the bar code 301 contains a supplemental portion. As a result, after the supplemental portion is properly analyzed, the flow advances to step S209 Thereafter, at step S209, the analyzed result of the main portion and the analyzed result of the supplemental portion are combined. At step S210, the combined result is transmitted to the host unit. Thereafter, the process is completed.

(2) Next, the operation in aB case where the second bar code 302 is read will be described. As described above, the first three digits of the main portion of the second bar code 302 are "491", and the second bar code 302 does not contain a supplemental portion.

According to the flow chart shown in FIG. 5, after the main portion of the second bar code 302 has been analyzed at step S201, the flow advances to step S202. The determined result of the main portion at step S202 represents that the second bar code 302 is of type EAN-13. Thereafter, the flow advances to step S203.

At step S203, the first three digits of the analyzed result of the main portion are compared with the designated code "491" registered with the designated code register 33. In this case, since the designated code "491" match the first three digits of the analyzed result of the main portion, the determined result at step S203 is "Yes". Thus, the flow advances to step S204.

At step S204, the timeover counting timer 34 is reset. Thereafter, at step S205, the supplemental portion is analyzed. At step S206, it is determined whether or not the supplemental portion has been properly analyzed. If the supplemental portion has not been properly analyzed, the flow advances to step S207. At step S207, it is determined whether or not the timer has timed over. If the timer has timed over, the determined result represents that "the bar code does not contain a supplemental portion". Thereafter, the flow advances; to step S209. If the timer has not timed over, the flow advances to step S208. At step S208, the data of the supplemental portion is read once again. At step S205, the supplemental portion is analyzed once again.

In a case of the second bar code 302, although the first three digits are "491", the second bar code 302 does not contain a supplemental portion. Thus, the retry loop consisting of steps S205->S206->S207->S208->S205 continues until the timer times over. Thus, the analysis of the supplemental portion is cancelled. Thereafter, the flow advances to step S209. Thereafter, at step S210, the analyzed result of only the main portion is transmitted to the host unit. Thereafter, the process is completed.

(3) Next, the operation in a case where the third bar code 303 is read will be described. As was described above, the first three digits of the third bar code 303 are "492" (not "491"). However, the third bar code 303 contains a supplemental portion.

According to the flow chart shown in FIG. 5, at step S201, the main portion is analyzed. Thereafter, the flow advances to step S202. The determined result of the main portion at step S202 represents that the third bar code 303 is of type EAN-13. Thereafter, the flow advances to step S203.

At step S203, the first three digits of the analyzed result of the main portion are compared with the designated code "491" registered with the designated code register 33. In this case, since the designated code "491" do not match the first three digits "492" of the analyzed result of the main portion, the determined result at step S203 is "No". As a result, the analyzing process (steps S204 to S208) for the supplemental portion is omitted. Thereafter, the flow advances to step S209. Thereafter, at step S210, the analyzed result of only the main portion is transmitted to the host unit. Thereafter, the proccess is completed. In such a manner, the third bar code 303 of which the first three digits of the main portion are not "491" and that contains a supplemental portion is treated as a bar code that does not contain a supplemental portion.

(4) Next, the operation in a case where the fourth bar code 304 is read will be described. As was described above, the first three digits of the main portion of the fourth bar code 304 are "492" (not "491"). The fourth bar code 304 does not contain a supplemental portion.

According to the flow chart shown in FIG. 5, at step S201, the main portion of the fourth bar code 304 is analyzed. Thereafter, the flow advances to step S202. The determined result of the main portion at step S202 represents that the bar code 304 is of type EAN-13. Thereafter, the flow advances to step S203.

At step S203, the first three digits of the analyzed result of the main portion are compared with the designated code "491" registered with the designated code register 33. In this case, since the designated code "491" does not match the first three digits "492" of the analyzed result of the main portion, the determined result of the main portion at step S203 is "No". As a result, the analyzing process for the supplemental portion is omitted. Thereafter, the flow advances to step S209. Thereafter, the analyzed result of only the main portion is transmitted to the host unit. Thereafter, the process is completed.

The fourth bar code 304 of which the first three digits of the main portion are "492" and that does not contain a supplemental portion is treated as a bar code that does not contain a supplemental portion without need to perform the retry loop of steps S204 to S208. Thus, the process is early completed. In this case, the fourth bar code 304 can be considered as a regular bar code that does not contain a supplemental portion.

Next, with concrete values, the effect of the example will be described.

Figure 7:
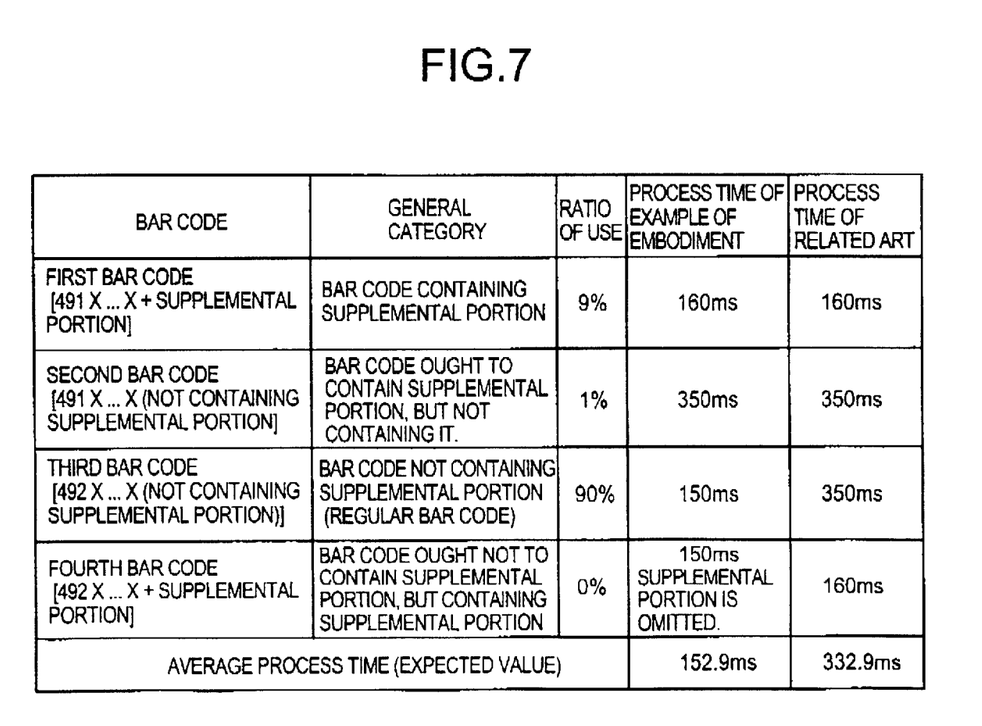
FIG. 7 is a schematic diagram for explaining the effect of the embodiment of the present invention.

At present time, in Japan, bar codes that contain a supplemental portion are rare. However, bar codes that contain a supplemental portion are being studied for future use. In other words, in near future, types EAN-13, EAN-8 and so forth of bar code that do not contain a supplemental portion and bar codes that contain a supplemental portion will coexist. FIG. 7 shows predicted results of ratio of use of the first to fourth bar codes that will be used in near future in Japan and calculated results of concrete effects of the example of the embodiment. In FIG. 7, the ratio of use of the first to fourth bar codes are 9%, 1%, 90%, and 0%, respectively.

As is apparent from FIG. 7, according to the example of the embodiment of the present invention, the process time for the third bar code of which the first three digits of the main portion do not match the designated code and that does not contain a supplemental portion (namely, regular bar code)" is much shorter than that of the first related art technology. In addition, according to the example of the embodiment of the present invention, the average process time (expected value) in consideration of ratio of use of the first to fourth bar codes can be shortened to around 45% as compared with the process time of the first related art technology.

At present time, bar codes that contain a supplemental portion are rare. Therefore, conventional bar code reading apparatus that do not have the function for determining whether or not a bar code contains a supplemental potion are widely used. The average process time of such a conventional bar code reading apparatus is around 150 ms. In contrast, when the ratio of use of the first to fourth bar codes is as shown in FIG. 4, the average process speed of the bar code reading apparatus according to the example of the embodiment of the present invention is 152.9 ms. Thus, the average process time of the bar code reading apparatus according to the example of the embodiment of the present invention is longer than that of the conventional bar code reading apparatus by around 3.9%. On the other hand, the average process time of the first related art technology is 332.9 ms. Thus, the average process time of the first related art technology is longer than that of the example of the embodiment of the present invention by around 122%.

According to the example of the embodiment of the present invention, the analyzing process for the fourth bar code "that contains a supplemental portion although the bar code ought not to contain the supplemental portion" is omitted. As a result, the supplemental portion of the fourth bar code is not processed as data. However, in Japan, individual digits of bar codes are managed by The Distribution Systems Research Institute (DCC-JAPAN). Thus, it can be said that such bar codes do not exist in Japan.

Bar Codes in the Field of Circulation Used in United States

At present, the UPC system has been used instead of the EAN system in the United States and Canada. The UPC system is the origin form of the EAN system. However, the physical structure of the bar codes of the former is the same as the latter. More specifically, an EAN-13 bar code starting with "0" is a UPC-A bar code. Bar code numbers of the UPC system used in the United States are managed by the UCC (United Code Council Inc.). For books and magazines in the United States, "UPC-A+supplemental code" is used.

Global Bar Code

At present, bar codes are globally managed by the EAN International (except for United States and Canada). The EAN International has assigned national codes to individual countries (for example, "49" and "45" to Japan). Each national bar code management association (in Japan, The Distribution Systems Research Institute) manages bar code numbers of the country.

In 1980, the EAN International and the ISBN International Organization had agreed on EAN/ISBN. For bar codes of books and magazines, books have been assigned "978" (first three digits of bar code)+(ISBN code) and magazines had been assigned "977" (first three digits of bar code)+ (ISSN code). Thereafter, in each country, bar codes starting with "978" and "977" have been used. As code system, "EAN 13+supplemental code" has been used.

For books, "EAN 13+5-digit supplemental code" is used. The 5-digit supplemental code portion represents the price of book. For magazines, "EAN 13+2-digit supplemental code" is used. The 2-digit supplemental code portion represents an issue number of magazine (for example, "December" issue is represented as "12"; "35-th week" issue is represented as "35").

Uncoming Code Systems in United States and Canada

The United States and Canada that have used the UPC system so far have scheduled to use the EAN system by the year of 2005. Thus, the United States and Canada will use the rules of the EAN system.

Effects of Present Invention

In such International environment, the effects of the present invention are as follows:

For description, the designated codes "978" and "977" are set.

Definition of types of bar codes
(1) 978xx . . . xx+5-digit supplemental portion
Designated code, with supplemental portion
(1)' 977xx . . . xx+2-digit supplemental portion
Designated code, with supplemental portion
(2) 978xx . . . xx (without supplemental portion)
Absence of supplemental portion that is physically contained
(2)' 977xx . . . xx (without supplemental portion)
Absence of supplemental portion that is physically contained
(3) 487xx . . . xx (without supplemental portion)
Absence of supplemental portion that is not physically contained (regular type)
(4) 487xx . . . xx+supplemental portion
Presence of supplemental portion that is not physically contained

| | Ratio of use | Process time of embodiment | Process time of prior art |
|---|---|---|---|
| (1) | 8% | 160 ms | 160 ms |
| (1)' | 8% | 160 ms | 160 ms |
| (2) | 1% | 350 ms | 350 ms |
| (2)' | 1% | 350 ms | 350 ms |
| (3) | 82% | 150 ms | 350 ms |
| (4) | 0% | 150 ms | 160 ms |
| | Average process time | 155.6 ms | 319.6 ms |

It can be expected that the process time of the embodiment is decreased to around 48.7% of the process Lime of the prior art.

As was described above, according to the present invention, it is recognized whether or not a bar code contains a supplemental portion depending on whether or not a predetermined code is contained at a predetermined digit position of a main portion of the bar code. Even if the recognized result represents that the bar code contains a supplemental portion corresponding to the designated code, if the analyzed result of the supplemental portion cannot be obtained in a predetermined time period, the analyzed result of only the main portion is output. Thus, in the environment that bar codes that contain a supplemental portion and bar codes that do not contain a supplemental portion coexist, the process speed can be improved. In addition, the process can be prevented from being delayed due to a dirt, a drop, or the like of the supplemental portion.

In addition, according to the present invention, before the process for determining whether or not a bar code contains a supplemental portion is performed, it is determined whether or not the bar code has a possibility that the bar code contains a supplemental portion. Such a process is performed for only a bar code that has a possibility that the bar code contains a supplemental portion. Thus, the process speed can be further improved.

Although the present invention has been shown and described with respect to the best mode embodiment thereof, it should he understood by those skilled in the art that the fore going and various other changes, omissions, and additions in the form and de tail thereof may be made therein without departing from the spirit and scope of the present invention.

What is claimed is:

1. A bar code reading method, comprising the steps of:
performing a supplemental portion presence/absence determining process for determining whether or not a bar code contains a supplemental portion depending on whether or not an analyzed result of a predetermined number of digits starting from a predetermined digit position in a main portion of the bar code matches a predetermined code;
if the determined result of the supplemental portion presence/absence determining process represents that the bar code does not contain the supplemental portion, outputting the analyzed result of the main portion;
if the determined result of the supplemental portion presence/absence determining process represents that the bar code contains the supplemental portion, performing an analyzing process for the supplemental portion until the analyzed result of the supplemental portion is obtained or until a predetermined time period elapses;
if the analyzed result has not been obtained when the predetermined time period elapses, outputting the analyzed result of only the main portion; and
if the analyzed result of the supplemental portion has been obtained before the predetermined time period elapses, combining the analyzed result of the main portion and the analyzed result of the supplemental portion and outputting the combined result.

2. The bar code reading method as set forth in claim 1, further comprising the steps of:
before the supplemental portion presence/absence determining process is performed, determining whether or not the bar code is a type of bar code which has a possibility that the bar code contains a supplemental portion; and
if the bar code is not the type of bar code, outputting the analyzed result of the only main portion without performing the supplemental portion presence/absence determining process; and
if the bar code is the type of bar code, performing the supplemental portion presence/absence determining process.

3. The bar code reading method as set forth in claim 2, wherein the type of a bar code which has the possibility that the bar code contains a supplemental portion is one of EAN-13, EAN-8, UPC-A, and UPC-E.

4. A bar code reading apparatus, comprising:
main portion analyzer for analyzing a main portion of a bar code;
presence/absence determiner for determining whether or not the bar code contains a supplemental portion depending on whether or not an analyzed result of a predetermined number of digits starting from a predetermined digit position in the main portion of the bar code matches a predetermined code;
supplemental portion analyzer for performing an analyzing process for the supplemental portion if the determined result of the presence/absence determiner represents that the bar code contains the supplemental portion, until the analyzed result of the supplemental portion is obtained or until a predetermined time period elapses; and
combiner for outputting the analyzed result of only the main portion if the determined result of the presence/absence determiner represents that the bar code does not contain a supplemental portion or if the analyzed result of the supplemental portion has not been not obtained by the supplemental portion analyzer when the predetermined time period elapses, and for outputting the analyzed result of the main portion and the analyzed result of the supplemental portion if the analyzed result of the supplemental portion has been obtained by the supplemental portion analyzer before the predetermined time period elapses.

5. The bar code reading apparatus as set forth in claim 4, wherein the main portion analyzer determines whether or not the bar code is a type of bar code which has a possibility that the bar code contains a supplemental portion, and
wherein if the determined result by the main portion analyzer represents that the bar code is not the type of bar code, the combiner outputs the analyzed result of only the main portion analyzer.

6. The bar code reading apparatus as set forth in claim 5, wherein the type of bar code which has the possibility that the bar code contains a supplemental portion is one of EAN-13, EAN-8, UPC-A, and UPC-E.

7. A computer program product embodied on a computer-readable medium and comprising codes that, when executed, cause a computer to perform a bar code reading method comprising the steps of:

performing a supplemental portion presence/absence determining process for determining whether or not a bar code contains a supplemental portion depending on whether or not an analyzed result of a predetermined number of digits starting from a predetermined digit position in a main portion of the bar code matches a predetermined code;

if the determined result of the supplemental portion presence/absence determining process represents that the bar code does not contain the supplemental portion, outputting the analyzed result of the main portion;

if the determined result of the supplemental portion presence/absence determining process represents that the bar code contains the supplemental portion, performing an analyzing process for the supplemental portion until the analyzed result of the supplemental portion is obtained or until a predetermined time period elapses;

if the analyzed result has not been obtained when the predetermined time period elapses, outputting the analyzed result of only the main portion; and if the analyzed result of the supplemental portion has been obtained before the predetermined time period elapses, combining the analyzed result of the main portion and the analyzed result of the supplemental portion and outputting the combined result.

8. The computer program product as set forth in claim 7, wherein said method further comprises the steps of:

before the supplemental portion presence/absence determining process is performed, determining whether or not the bar code is a type of bar code which has a possibility that the bar code contains a supplemental portion; and if the bar code is not the type of bar code, outputting the analyzed result of the only main portion without performing the supplemental portion presence/absence determining process; and if the bar code is the type of bar code, performing the supplemental portion presence/absence determining process.

9. The computer program product as set forth in claim 8, wherein the type of a bar code which has the possibility that the bar code contains a supplemental portion is one of EAN-13, EAN-8, UPC-A, and UPC-E.

* * * * *